United States Patent [19]
Blatter

[11] Patent Number: 5,416,398
[45] Date of Patent: May 16, 1995

[54] METHOD AND DEVICE FOR OPERATING A SYNCHRONOUS MACHINE

[75] Inventor: Richard Blatter, Ennetbaden, Switzerland

[73] Assignee: Asea Brown Boveri Ltd., Baden, Switzerland

[21] Appl. No.: 11,758

[22] Filed: Feb. 1, 1993

[30] Foreign Application Priority Data
Feb. 17, 1992 [DE] Germany ............... 42 04 677.7

[51] Int. Cl.$^6$ ............................................. H02H 7/08
[52] U.S. Cl. ...................................... 318/700; 318/722
[58] Field of Search ............... 318/700, 705, 709, 710, 318/711, 712, 722, 723, 254

[56] References Cited

U.S. PATENT DOCUMENTS

| | | |
|---|---|---|
| 4,012,679 | 3/1979 | Matsuda et al. |
| 4,931,715 | 6/1990 | Lee et al. ............... 318/709 |
| 5,272,424 | 12/1993 | Lee ......................... 318/560 |

FOREIGN PATENT DOCUMENTS 2110747 9/1972 Germany.

OTHER PUBLICATIONS

"Frequenzumrichter zum Anlassen der Synchronmaschinen in einem Pumpspeicherwerk", Hogberg, ASEA ZEITSCHRIFT 1976, Jahrgang 21, Heft 4, pp. 75–80.
"Standardized Starting Equipment", Peneder, et al., BBC Brown Boveri Publication No. CH-E 2.0340.0E, pp. 1–8.

Primary Examiner—Bentsu Ro
Attorney, Agent, or Firm—Burns, Doane, Swecker & Mathis

[57] ABSTRACT

A synchronous machine (22) can be run up with increasing frequency by a controllable frequency converter (21) with an opened switch (S1) and a closed switch (S2), the exciter direct current for its exciter winding (22E) being supplied by a starting converter (23). When the synchronous machine (22) is operated from the power system, it is excited by the direct-current link of this frequency converter (21). In order to increase the availability of the synchronous machine (22), the two static converters (18, 19) of the frequency converter (21) can be selected in two channels so that when one static converter fails due to a fault, the other one generates the link direct voltage (Uzk) required for the direct-current excitation. The rotor of the synchronous machine (22) can be coupled to a gas turbine (28) via a transmission (27).

3 Claims, 1 Drawing Sheet

METHOD AND DEVICE FOR OPERATING A SYNCHRONOUS MACHINE

BACKGROUND OF THE INVENTION

1. Field of the Invention

The invention is based on a method and a device for operating a synchronous machine in accordance with the preamble of claims 1 and 2.

2. Discussion of Background

In the preambles of claims 1 and 2, the invention refers to a background which is known from the ASEA Journal 1976, Vol. 4, pages 75–80. In this journal, a static frequency converter, the link voltage of which is used for exciting the rotor windings, is used for starting pump turbine units with synchronous machines. Above a frequency of 5 Hz, the system switches from self-commutation with resonant-circuit control to load-controlled commutation with the aid of the voltage generated by the motor. At about 15% of the rated speed, the water is pushed down in the pump turbine so that the runner rotates in air during the remaining run-up. The plant is provided with an integrated protection device for detecting and signalling internal disturbances such as overvoltages and ground faults. There is an electronic pulse inhibitor as protection against overcurrents.

German Offenlegungsschrift 21 10 747 discloses a comparable background for starting gas turbines or pumped-storage units.

There is no provision for redundantly using the static converters of the frequency converters in a fault case.

Additional reference relating to the relevant background is made to the house journal of the Swiss firm BBC Brown, Boveri & Company, Baden, publication No.: CH-E 2.0340.0 E, title: Standardized Starting Equipment, January 1979, pages 1–8, from which it is known to start synchronous machines, which can be used, for example, in conjunction with gas turbines, pumped-storage plants and synchronous compensators, by means of a static frequency converter.

SUMMARY OF THE INVENTION

The invention as defined in claims 1 and 2 achieves the object of developing a method and a device for operating a synchronous machine of the type initially mentioned in such a manner that its reliability is increased.

An advantage of the invention consists in that the redundant use of the static converter of the frequency converter results in greater availability of the plant.

The run-up and excitation device for the synchronous machine can also be used in conjunction with gas turbines.

BRIEF DESCRIPTION OF THE DRAWINGS

A more complete appreciation of the invention and many of the attendant advantages thereof will be readily obtained as the same becomes better understood by reference to the following detailed description when considered in conjunction with the accompanying single figure, where a run-up and excitation device for a synchronous machine which is coupled to a gas turbine is shown.

DESCRIPTION OF THE PREFERRED EMBODIMENTS

Figure 1:
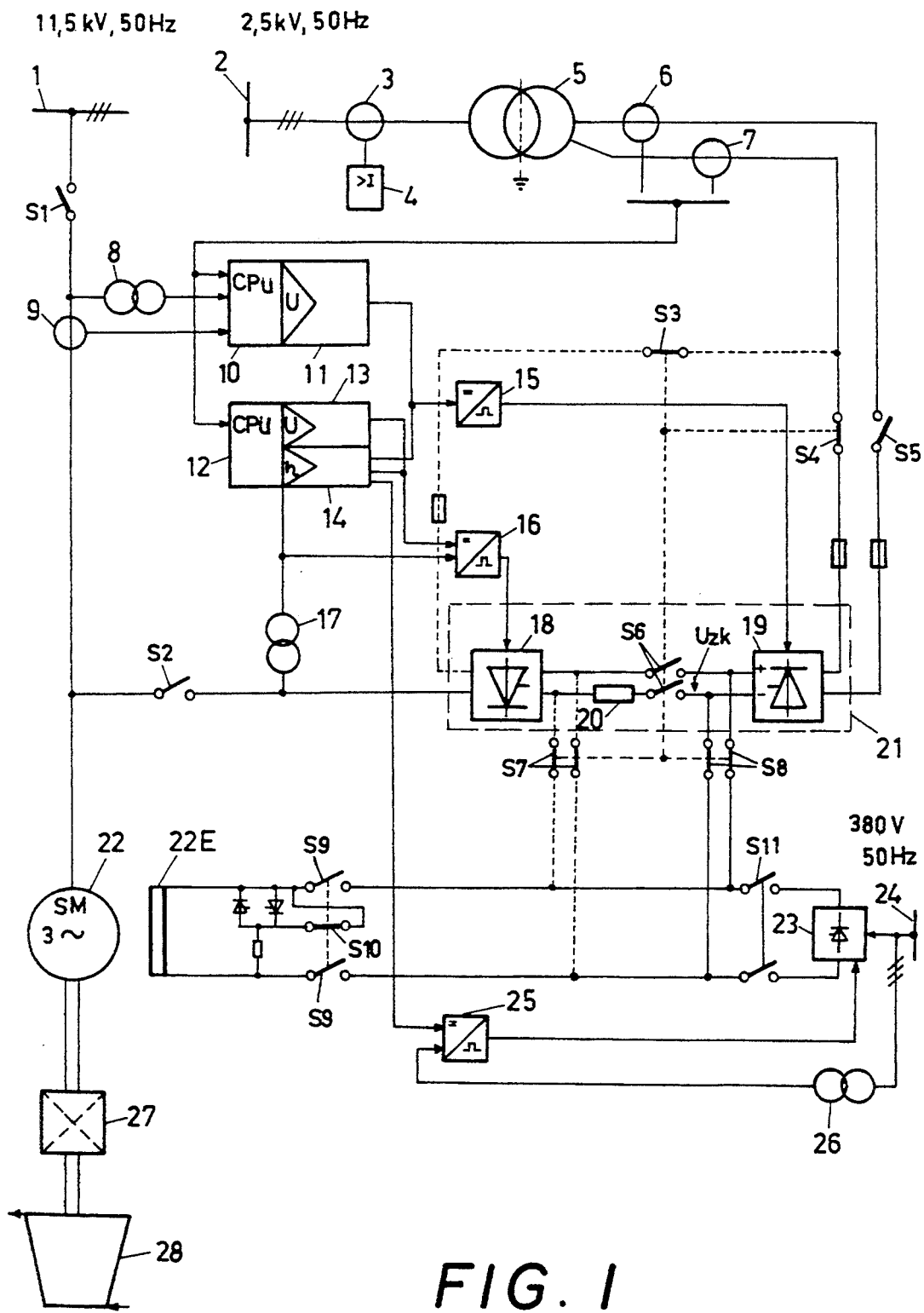
FIG. 1 shows an exemplary embodiment of a run-up and excitation device for a synchronous machine.

A synchronous machine (22) is connected at its stator end, on the one hand via a current transformer (9) and a switch (S1) to a three-phase system or alternating-current system (1) having an alternating voltage of 11.5 kV and a frequency of 50 Hz and, on the other hand, via a switch (S2) to a frequency converter (21). The frequency converter (21) exhibits two controllable static converters (18, 19) which are connected to one another via a direct-current link comprising a link reactor (20) and a dual switch (S6). A link direct voltage ($U_{zk}$) can be applied to an exciter winding (22E) of the synchronous machine (22) via closed dual switches (S8) and (S9) when the dual switch (S6) is opened. When the dual switch (S6) is closed and the dual switch (S8) is open, the link direct voltage ($U_{zk}$) can be applied to the exciter winding (22E) via a dual switch (S7) as indicated with dashed lines.

The static converter (19) is connected via fuses, switches (S4, S5) and current transformers (6, 7) to a secondary winding of a static converter transformer (5) which is connected on the primary side via a current transformer (3) to a three-phase auxiliary system or alternating-current system (2) with an alternating voltage of 2.5 kV and a frequency of 50 Hz. (4) designates a protective relay which is connected to the current transformer (3) and switches off with a predeterminable overcurrent.

The current transformers (6, 7) supply current signals to microprocessors or high-speed computers (10, 12). The high-speed computer (10) receives at its input end a further current signal from the current transformer (9) and a line voltage signal from a voltage transformer (8), the input side of which is connected to the rotor winding of the synchronous machine (22). At its output end, the high-speed computer (10) is connected via an automatic voltage regulator (11) to a firing-pulse transformer (15) which supplies firing signals to the static converter (19). The high-speed computer (12) is connected at its output end to a manually operable voltage regulator (13) and to a load-commutatable or start-up regulator (14). The start-up regulator (14) acts at its output end on the firing pulse transformer (15) and on a further firing pulse transformer (16) which supplies on its output side firing signals to the static converter (18). The firing pulse transformer (16) additionally receives on its input side an output signal of the voltage regulator (13) and a voltage signal from a voltage transformer (17) which is connected to the rotor of the synchronous machine (22) via the switch (S2) and also provides its output signal to the start-up regulator (14).

Right at the start of the run-up, the exciter winding (22E) of the synchronous machine (22) is fed with direct current from a starting converter (23) via closed dual switches (S9) and (S11). The starting converter (23) receives its power from a start exciter current source (24) with an alternating voltage 380 V and a frequency of 50 Hz; it is fired from a firing pulse transformer (25). The firing pulse transformer (25) receives a control signal from the start-up regulator (14) and from a voltage transformer (26) which is connected to the start exciter current source (24). (S10) designates a switch which is closed when the dual switch (S9) is open and which is open when the dual switch (S9) is closed. A switch (S3) is connected, on the one hand, to the switch (S4) and, on the other hand, via a fuse to the alternating-current input of the static converter (18), compare the dashed line. All switches connected by dashed lines are opened when the associated switches, not connected by dashed lines, are closed, and conversely.

The synchronous machine (22) is drive-connected at its rotor end to a gas turbine (28) via a transmission (27). The transmission (27) can also be omitted. The gas turbine (28) can be fed by combustion gases from a diesel engine or from a special combustion chamber and possibly interact with one or with a number of steam turbines.

It is important that the exciter direct voltage for the exciter winding (22E) is taken from the direct-current link of the frequency converter (21) when the synchronous machine (22) is line-operated.

The synchronous machine (22) is run up with an opened switch (S1) and closed switch (S2) by the static converter (18) which is operated as inverter with increasing frequency and is fed from the direct-current link.

When the rated speed of the synchronous machine (22) has been reached, the switch (S2) is opened and the switch (S1) is closed.

The additional feeding of the static converter (18) via the switch (S3), however, allows a 2-channel excitation in the subsequent continuous operation of the synchronous machine (22). If, for example, the static converter (19) fails due to a fault during the continuous operation, the static converter (18) can be connected to the alternating-current system (2) via the switch (S3) and can be operated as rectifier in order to generate the direct current required for the excitation of the exciter winding (22E). If, for example, the static converter (18) fails due to a fault, the static converter (19) can supply the required direct current for the exciter winding (22E).

Naturally, the alternating-current systems (1) and (2) and the start exciter current source (24) can be operated with other alternating voltages than those specified and, for example, with 60 Hz. The static converter transformer (5) could also be connected to the alternating-current system (1).

Obviously, numerous modifications and variations of the present invention are possible in the light of the above teachings. It is therefore to be understood that within the scope of the appended claims, the invention may be practised otherwise than as specifically described herein.

What is claimed as new and desired to be secured by Letters Patent of the United States is:

1. A method for operating a synchronous machine, the method comprising the steps of:
    a) feeding at least one exciter winding of a rotor of the synchronous machine from a link direct voltage of a frequency converter having at least one static converter;
    b) during start up, effectively connecting at least one stator winding of the synchronous machine to said at least one static converter of the frequency converter; and
    c) during steady state operation, in the event of a fault or failure of the static converter of the frequency converter, having another static converter of the frequency converter take over feeding of the exciter winding.

2. A device for operating a synchronous machine, comprising:
    a) at least one stator winding in said synchronous machine which is effectively connected via a switch to a frequency converter with at least two static converters having a direct-current link, said at least one stator winding being switchable to line voltage in steady state operation;
    b) at least one exciter winding for a rotor of said synchronous machine which is connected to the direct-current link of the frequency converter for direct-current excitation of the synchronous machine; and wherein
    c) the two static converters of the frequency converter are redundantly selectable in such a manner that, in the event of a failure of a first of said at least two static converters due to a fault, a second of said at least two static converters takes over feeding of the exciter winding during steady-state operation.

3. A device as claimed in claim 2, wherein the rotor of the synchronous machine is effectively mechanically connected to a gas turbine.

* * * * *